United States Patent [19]

Pye et al.

[11] 4,201,678
[45] May 6, 1980

[54] FOAM DRILLING AND WORKOVER IN HIGH TEMPERATURE WELLS

[75] Inventors: David S. Pye, Brea; Paul W. Fischer, Whittier, both of Calif.

[73] Assignee: Union Oil Company of California, Brea, Calif.

[21] Appl. No.: 887,596

[22] Filed: Mar. 17, 1978

[51] Int. Cl.$^2$ ............................................. C09K 7/02
[52] U.S. Cl. .............................. 252/8.5 A; 252/8.5 C; 252/8.55 R
[58] Field of Search ............ 252/8.5 A, 8.5 C, 8.55 B, 252/8.55 R

[56] References Cited

U.S. PATENT DOCUMENTS

| | | | |
|---|---|---|---|
| 3,275,552 | 9/1966 | Kern et al. | 252/8.55 |
| 3,318,379 | 5/1967 | Bond et al. | 166/274 |
| 3,486,560 | 12/1969 | Hutchison et al. | 252/8.5 X |
| 3,572,439 | 3/1971 | Hutchison et al. | 252/8.5 X |
| 4,013,568 | 3/1977 | Fischer et al. | 252/8.5 |
| 4,092,252 | 5/1978 | Fischer et al. | 252/8.5 |

OTHER PUBLICATIONS

McCutcheon's Detergents & Emulsifiers, 1973 North American Edition, Published by McCutcheon's Division, Allured Publishing Corp., N. J., pp. 26 and 193.

*Primary Examiner*—Herbert B. Guynn
*Attorney, Agent, or Firm*—Dean Sanford; Gerald L. Floyd

[57] ABSTRACT

A method for conducting foam drilling and workover operations in a bore hole penetrating a subterranean reservoir, particularly a high-temperature reservoir such as a geothermal reservoir, employing an aqueous foaming solution of about 0.08 to 1.0 percent by weight of an amphoteric betaine, about 0.02 to 0.4 percent by weight of a salt of a linear aliphatic or alkyl aryl hydrocarbon sulfonate, and, optionally, from 0.03 to 3.5 percent by weight unneutralized ammonia.

19 Claims, No Drawings

FOAM DRILLING AND WORKOVER IN HIGH TEMPERATURE WELLS

BACKGROUND OF THE INVENTION

1. Field of the Invention

This invention relates to the drilling and workover of wells penetrating subterranean reservoirs, particularly high temperature reservoirs, and more particularly to the drilling and workover of such reservoirs with foam drilling fluids.

2. Description of the Prior Art

It has long been conventional practice in the drilling of bore holes penetrating subterranean reservoirs to circulate a drilling fluid down the drill pipe and back up the bore hole annulus for the removal of debris and drill cuttings from the bore hole. Drilling fluid also serves to prevent sloughing in the bore hole during the drilling operation. Recently, air or other gases have replaced conventional drilling fluids in the drilling of some bore holes, and have proved particularly beneficial in reservoirs wherein dense conventional drilling fluids would be lost to the formation. Additionally, gases have also provided longer bit life and higher rates of penetration in the drilling of bore holes.

However, in many reservoirs, water enters the bore hole from adjacent water-containing strata; and gases have proved unable to remove this water. In view of this problem, foams have been developed to remove both the cuttings and the water from these bore holes. Numerous foam compositions have been proposed and used; however, as yet, foams have not been satisfactorily used in the drilling and workover of wells penetrating high-temperature subterranean reservoirs, such as geothermal reservoirs.

At present, geothermal reservoirs are drilled using air or other gases as the drilling or workover fluid. This is particularly true in the vapor-dominated geothermal reservoirs wherein the low bottom-hole pressure precludes the use of heavy drilling fluids, such as conventional drilling muds. If used, circulation of these conventional drilling fluids would quickly be lost to the low-pressure reservoir. Also, the high temperature of the geothermal reservoirs have precluded the use of foams normally used in the typically low-temperature, oil-bearing reservoirs. While the temperature of typical oil-bearing reservoirs amenable to foam drilling may reach as high as 200° F., the geothermal wells now being drilled have bottom-hole temperatures of from about 400° F. to about 700° F. Because these high-temperatures greatly reduce foam stability, foams have not been used extensively as drilling or workover fluids in wells penetrating high-temperature subterranean reservoirs, such as wells penetrating geothermal reservoirs.

A wide variety of compounds are known to have detergent and foam-forming capabilities. For example, McCutcheon's Detergents and Emulsifiers, North American Edition, 1973 Annual, page 193, describes various betaine compounds as foam stabilizers and detergents. The same publication at page 26 describes various sodium linear alkylate sulfonates as liquid detergent bases.

U.S. Pat. No. 3,318,379 to Bond et al. describes a secondary recovery process in which a bank of foam is formed in situ and driven through the reservoir. Listed among a large group of surface active agents which can be used alternatively to generate the foam are Product BCO identified as C-cetyl betaine and Petrowet R identified as sodium alkyl sulfonate.

When a foam in a high temperature well contains air, or contacts and is contaminated by reservoir fluids containing air or oxygen, corrosion of the drill string, casing and other metal equipment contacted by the foam drilling fluid can occur.

U.S. Pat. No. 3,572,439 to Hutchison describes an ammoniated gas-in-liquid foam as a circulation fluid, e.g., drilling fluid, in wells. The ammonia enables the foam to be used in low velocity circulation. The foam is preferably preformed and generated using a concentrate which contains water, any foaming agent, for example lauryl sulfonate, or C-cetyl betaine, and ammonia or ammonium hydroxide.

U.S. Pat. application, Ser. No. 683,092, by Fischer and Pye filed May 4, 1976, now U.S. Pat. No. 4,092,252, discloses a foam drilling fluid containing, in part, a foaming agent and ammonia to provide corrosion protection in the vapor phase.

The various methods of the foregoing references have met with some success. However, many corrosion inhibitors were found to decrease the foam forming ability and/or foam stability of many foaming agents. Numerous combinations of corrosion inhibitors and foaming agents are not compatible.

Thus, there is a need for a drilling and workover method which employs a foam that is stable at high temperature, which can be used in high-temperature subterranean reservoirs and which is not affected by the presence of a corrosion inhibitor.

Accordingly, a principal object of this invention is to provide a method for conducting foam drilling and workover operations in high-temperature subterranean reservoirs.

Another object of this invention is to provide a method for conducting foam drilling and workover operations in high-temperature geothermal reservoirs.

Still another object of this invention is to provide a method for conducting foam drilling and workover operations in high-temperature subterranean reservoirs which employs a foaming agent that is stable at the temperatures encountered.

A further object of this invention is to provide a method for conducting foam drilling and workover operations in geothermal reservoirs which employs a foaming agent that is stable at the temperatures encountered.

A still further object of this invention is to provide such a method wherein the foam drilling fluid and workover fluid contain a corrosion inhibitor.

Other objects and advantages of this invention will become apparent to those skilled in the art from the following description.

SUMMARY OF THE INVENTION

Briefly, this invention provides a method for conducting foam drilling and workover operations in subterranean reservoirs which employs a foam having stability at high temperatures. The foam is formed by contacting a gas at elevated pressure with an aqueous foaming solution containing about 0.08 to 1.0 percent by weight of a first foaming agent, an amphoteric betaine having the formula:

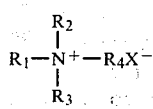

wherein R₁ is a high molecular weight alkyl radical having from 10 to 18 carbon atoms or the amide radical, RC.ONH(CH₂)₃, wherein R is a higher alkyl radical having from 10 to 18 carbon atoms, R₂ and R₃ are each alkyl radicals having from about 1 to 3 carbon atoms, R₄ is an alkylene or hydroxyalkylene radical having from 1 to 4 carbon atoms, and X is an anion selected from the group consisting of SO₃⁼ and COO⁼ radicals, about 0.02 to 0.4 percent by weight of a second foaming agent, a salt of a linear aliphatic or alkyl aryl hydrocarbon sulfonate having the formula:

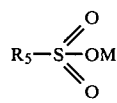

wherein R₅ is an oleophilic group having from 10 to 18 carbon atoms, and M is an alkali metal or ammonium cation, and, optionally, from 0.03 to 3.5 percent by weight of unneutralized ammonia. While the method of this invention is useful in low-temperature subterranean reservoirs, it has particular utility in high-temperature reservoirs, such as those having a temperature of above 200° F., and particularly above 400° F. The method is particularly suited for use in geothermal reservoirs.

DETAILED DESCRIPTION OF THE INVENTION

One serious problem encountered in foam drilling and workover operations carried out in high temperature wells is poor stability of the foam, i.e., the foam tends to at least partially break into its component parts and can no longer carry out some of its primary functions, e.g., can no longer adequately remove cuttings from the bore hole.

Another problem is corrosion of the drill string and other metal equipment exposed to the foam if the foam contains air or is contaminated by air or oxygen from the reservoir fluids during circulation through the well. In some instances, addition of a corrosion inhibitor to a foam composition decreases the stability of the foam which is otherwise stable at high temperatures. In the process of foam drilling and workover operations of this invention, there is employed a foaming agent mixture of a first foaming agent and a second foaming agent which forms a foam that is stable at high temperatures. If the foam contains air or is contaminated by air or oxygen, certain corrosion inhibitors can be added to the composition without substantially decreasing the stability of the foam.

The aqueous foaming solution employed in the method of this invention is an admixture of water and two foaming agents. The foaming agent composition contains about 0.08 to 1.0 percent by weight of a first foaming agent, an amphoteric betaine having the formula:

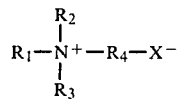

wherein R₁ is a high molecular weight alkyl radical having from 10 to 18 carbon atoms or the amide radical, RC.ONH(CH₂)₃, wherein R is a higher alkyl radical having from 10 to 18 carbon atoms, R₂ and R₃ are each alkyl radicals having from about 1 to 3 carbon atoms, R₄ is an alkylene or hydroxyalkylene radical having from 1 to 4 carbon atoms, and X is an anion selected from the group consisting of SO₃⁼ and COO⁼ radicals. Where the anion is COO⁼, the compound is a 1-carboxy-N,N,N-trialkylalkanaminium hydroxide inner salt, and where the anion is SO₃⁼, the compound is a 1-sulfo-N,N,N-trialkylalkanaminium hydroxide inner salt.

The first foaming agent is an amphoteric betaine. The name "betaine" was originally used to designate completely methylated glycine, (CH₃)N⁺—CH₂—CO—O⁻. As used herein, the term "amphoteric betaine" includes certain N-trialkyl derivatives of amino acids, or internal (intramolecular) salts of quaternary ammonium oxonium and sulfonium bases corresponding to the above formula. Examples of amphoteric betaine useful herein include the high alkyl betaines such as coco dimethyl carboxymethyl betaine, lauryl dimethyl carboxymethyl betaine, lauryl dimethyl alpha-carboxyethyl betaine, cetyl dimethyl carboxymethyl betaine, lauryl bis-(2 hydroxyethyl) carboxymethyl betaine, oleyl dimethyl gamma-carboxypropyl betaine, lauryl bis-(2 hydroxypropyl) alphacarboxyethyl betaine, ammonium salts of the foregoing and the like. Specific sulfobetaines include coco dimethyl sulfopropyl betaine, stearyl dimethyl sulfopropyl betaine, lauryl bis-(2 hydroxyethyl) sulfopropyl betaine and the like, amido betaines and amidosulfobetaines wherein the RCONH(CH₂)₃ radical is attached to the nitrogen atom of the betaine.

The second foaming agent is a linear aliphatic or alkyl aryl hydrocarbon sulfonate having the formula:

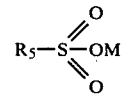

wherein R₅ is an oleophilic group having from 10 to 18 carbon atoms, and M is an alkali metal or ammonium cation. The R₅ group can include such oleophilic hydrocarbon radicals as alkyl, cycloalkyl, aryl, alkylaryl, alkenyl, alkylcycloalkyl, alkenylcycloalkyl, alkenylaryl, alkalkenyl and the like. Preferred are the aliphatic and alkylaryl hydrocarbon radicals. Preferred classes of foaming agents include the alkylbenzene sulfonates, the paraffin sulfonates, the alpha-olefin sulfonates and the internal olefin sulfonates. Of these foaming agents, the alphaolefin sulfonates are particularly preferred.

The aqueous foaming solution is prepared by admixing the foaming agents in water, such that the solution contains about 0.08 to 1.0 percent by weight of the first foaming agent and 0.02 to 0.4 percent by weight of second foaming agent, preferably about 0.15 to 0.6 percent by weight, of the first foaming agent and 0.06 to 0.25 percent by weight of the second foaming agent. The foaming agent can be added individually to water in any desired order, or mixed together and the resulting mixture added to water. The foaming agent composition can be premixed at the surface or the two foaming agent components and water injected down the well separately in any desired order, or in any desired combination, whereupon the foaming agent composition forms as the components pass down the well and mix. Optionally, other ingredients such as corrosion inhibitors and scale deposition inhibitors can be added to the foaming agent solution.

The gas which is used with the foaming solution to generate the foam can be nitrogen, natural gas, methane, butane, carbon dioxide, or air, with air being preferred. The foam itself will contain, measured at the existing bottom-hole pressure, about 90 to 99.5 volume percent of the gas, and correspondingly about 0.5 to 10 volume percent of the foaming solution.

In a high temperature environment, when the foam is generated using air or the foam is contaminated by air or oxygen during circulation through a well, the foam is corrosive to the drill string and other metal equipment with which it comes in contact. In these circumstances, it is preferred to add to the foam unneutralized ammonia as a corrosion inhibitor. By unneutralized ammonia is meant ammonia and/or ammonium hydroxide in excess of any ammonium salt-forming acid which may be present in the aqueous foaming solution. The amount of unreacted ammonia required is that necessary to maintain the return stream of foam circulated out of the well at a pH of 9.5 to 11.0. The amount required will vary somewhat depending on the nature of the water used to generate the foam. Some waters contain buffers and require more ammonia to provide a given pH than do purer waters. Generally, the aqueous foaming solution should contain about 0.03 to 3.5 percent by weight unreacted ammonia, when used.

The injection rates of the two fluids will be determined by the conditions existing in the bore hole, the desired velocity of the foam flowing up the bore hole annulus, and the size of the bore hole annulus. The relative rates of injection will be determined by the desired gas-liquid composition of the foam at the prevailing bottom-hole pressure. In most foam drilling operations, it is preferred that the velocity of the foam be in the range of from 80 to 600 feet per minute; however, lower velocities can be useful.

The foaming agent solution and gas can be injected at an elevated pressure through the drill pipe penetrating the subterranean reservoir and the foam generated by contact of the foaming agent solution and the gas caused to travel down the drill pipe and then up the bore hole annulus so that the foam carries the drill cuttings, liquids and other debris from the bottom of the bore hole to the surface of the earth. In a modification of this conventional mode, the foam can be preformed at the surface before injection into the bore hole. Alternatively, the two fluids can be injected simultaneously, but separately, down separate conduits and allowed to mix at the bottom of the hole. For example, in the drilling of a bore hole, the gas can be injected down a separate central pipe within the drill pipe, and the foaming agent solution can be injected down the annulus between the central pipe and the drill pipe. In some cases the gas can be injected down the annulus between the central pipe and the drill pipe, while the foaming agent solution is injected down the central pipe. The fluid injected down the central pipe will emerge from the drill pipe via ports in the drill bit. The fluid injected down the annulus will exit the drill pipe through perforations near the drill bit. It may be desired in conducting a foam drilling operation to inject the gas down the central pipe and the foaming agent solution down the annulus. This method reduces the loss of lubrication in the drill bit as a result of the detergent action of the foaming agent solution and also prevents the corrosion of the drill bit as a result of the direct contact of the foaming agent solution on the now lubricant-free drill bit surfaces.

When the foam is used in high-temperature reservoirs, sometimes it is desired to maintain sufficient pressure in the bore hole to prevent the liquid portion of the foam from flashing. For this reason, the top of the bore hole may be sealed so that the bore hole annulus does not directly communicate with the atmosphere; and the conduit at the surface for discharging the foam may be equipped with a valve for supplying the necessary back pressure to the bore hole.

The invention is further illustrated by the following examples which are illustrative of various aspects of the invention and are not intended as limiting the scope of the invention as defined by the appended claims.

EXAMPLES 1 to 12

An aqueous foaming composition is prepared using water condensate from a cooling tower at a geothermal power plant which water has the following geochemical analysis: 166 p.p.m. bicarbonate, nil carbonate, 5 p.p.m. chloride, 130 p.p.m. sulfate, 0.03 p.p.m. barium, 3.5 p.p.m. calcium, 7.0 p.p.m. iron, 0.3 p.p.m. magnesium, 1.8 p.p.m. sodium, 102 p.p.m. ammonia, and has a pH of 7.7. A series of 350 ml. aliquots of the aqueous foaming composition is prepared by adding to the water various combinations of an amphoteric betaine, a linear alkylate sulfonate and/or ammonium hydroxide and stirring for 30 minutes at 76° F. The amphoteric betaine is a 66 percent by weight aqueous solution of coco dimethyl ammonium carboxylic acid betaine. The linear aliphatic or alkyl aryl hydrocarbon sulfonate is a 37 percent by weight aqueous solution of sodium olefin sulfonate having 14 carbon atoms per molecule. The ammonium hydroxide is a 36 percent by weight aqueous solution of ammonium hydroxide.

The corrosivity of the aqueous foaming solution is determined by immersing a weighed rectangular coupon of J55 steel having a surface area of 3 square inches in 100 milliliters of foaming agent solution contained in a glass tube. The glass tube is placed in a large bomb equipped with two fittings on top to allow for the circulation of oxygen over the solution. Oxygen is passed through a saturator and saturated with water containing 10 percent by weight ammonium hydroxide. This moist oxygen is then passed into the bomb and circulated over the top of the aqueous foaming solution. A backpressure regulator is used to maintain the pressure in the bomb at 500 p.s.i. The system is heated in an oven at 400° F. for four hours. The test coupon is then removed from the test solution, cleaned by brushing with soap and water, dried with acetone, and the weight loss determined. The corrosion rate is then calculated. The results of these are reported in Table 1. These results show that with all foaming agent combinations tested, the corrosion rate is desirably low when sufficient ammonium hydroxide is present to maintain the aqueous foaming agent solution at a pH of 10. When only enough ammonium hydroxide is present to maintain the aqueous foaming agent solution at a pH of 8, the corrosion rate is undesirably high.

Next, the stability of foam prepared from each of the aqueous foaming solutions following their use in the corrosion test is determined. Various aqueous foaming solutions and air are passed separately through coils immersed in a 400° F. bath and then simultaneously pumped into a rectangular visual cell having a height of 13 inches and a horizontal cross section of 0.5 inch by 0.25 inch. The cell is placed in a bath heated to 400° F. The system containing a backpressure regulator is pressured to 500 p.s.i. with air. When a continuous foam is observed in the sight glass of the visual cell, the circulation of air is stopped and the height of the foam determined after various intervals of lapsed time. The results of these tests are reported in Table 1. These results show that with either type of foaming agent used alone, no foam forms under these extreme conditions of temperature and pressure. With a mixture of an amphoteric betaine and a linear aliphatic or alkyl aryl hydrocarbon sulfonate, a foam forms and the foam exhibits measurable stability.

droxide. These volumes of components prepares 10 barrels of aqueous foaming composition. During the drilling of this well, a foam drilling fluid is formed and circulated through the well as follows: The aqueous foaming solution is injected down the drill string of the well at a rate of 13 to 20 gallons per minute. Simultaneously, air is injected down the drill string at a rate of about 1,500 standard cubic feet per minute. The two fluids mix and form a foam during their passage down the drill string. One to three ¾ inch diameter backpressure chokes are used to maintain a backpressure on the column of drilling fluid. A visual determination is made of the cuttings removal effectiveness of the drilling fluid circulated out of the well. The pH of the aqueous foaming composition is determined as it is injected into the well and as it is circulated out of the well. The foaming ability of the aqueous foaming composition as it is injected into the well and as it is circulated out of the well is determined. In these tests, twenty five milliliter aliquots of each solution at room temperature are placed in separate long glass tubes having a frittered disc at the bottom. Air is forced through the frittered discs at a

TABLE 1

| | AQUEOUS FOAMING COMPOSITION | | | | | | |
|---|---|---|---|---|---|---|---|
| | Amphoteric Betaine* | Linear Aliphatic Hydrocarbon Sulfonate** | Ammonium | | Foam Stability at 400° F. and 500 psi | | Corrosion Rate at 400° F. and 500 psi |
| Example | Foaming Agent (% by weight) | Foaming Agent (% by weight) | Hydroxide*** (% by weight) | pH | Foam Height (inches) | Time (seconds) | (Mills per year) |
| 1 | 0.75 | none | 0.3 | 10 | 0 | 0 | 8 |
| 2 | 0.56 | " | " | 10 | 0 | 0 | 8 |
| 3 | 0.38 | " | " | 10 | 0 | 0 | 8 |
| 4 | 0.19 | " | " | 10 | 0 | 0 | 8 |
| 5 | none | 0.21 | " | 10 | 0 | 0 | 8 |
| 6 | " | 0.10 | " | 10 | 0 | 0 | 8 |
| 7 | " | 0.05 | " | 10 | 0 | 0 | 8 |
| 8 | 0.56 | 0.21 | " | 10 | 9 to 24 | 7 to 12 | 8 |
| 9 | 0.56 | 0.10 | " | 10 | 9 to 18 | 12 | 8 |
| 10 | 0.56 | 0.05 | " | 10 | 10 to 16 | 8 to 12 | 8 |
| 11 | 0.56 | 0.21 | 0.26 | 8 | did not determine | | 200 |
| 12 | 0.75 | none | " | 8 | did not determine | | 200 |

*a 66 percent by weight aqueous solution of coco dimethyl ammonium carboxylic acid betaine.
**a 37 percent by weight aqueous solution of sodium olefin sulfonate having 14 carbon atoms per molecule.
***a 36 percent by weight aqueous solution of ammonium hydroxide.

EXAMPLE 13

A well is drilled into a geothermal subterranean reservoir using a foam drilling fluid. The well is being drilled at a depth of 5,500 feet and has a bottom hole temperature of 500° F. An aqueous foaming composition is prepared by mixing together components in the following ratio: 414 gallons water having the composition described above in Examples 1 to 12, 3.4 gallons of a 66 percent by weight aqueous solution of coco dimethyl ammonium carboxylic acid betaine, 1.3 gallons of a 37 percent by weight aqueous solution of sodium olefin sulfonate having 14 carbon atoms and 1.2 gallons of a 36 percent by weight aqueous solution of ammonium hyconstant rate until each solution is totally foamed. The total height of each foam is then determined as a measure of the foaming ability of each solution. The results of these tests are given in Table 2. These tests show that the foam drilling fluid does a good job of removing cuttings during drilling. The pH of the drilling fluid remains sufficiently high during circulation to provide corrosion protection to the drill string. Even after being circulated through the well, the aqueous foaming solution retains its ability to form a foam.

TABLE 2

| Amount of Time Since Fluid Injection Started (Hours) | Cuttings Removal Ability | Pressure at Discharge (p.s.i.) | pH | | Height of Foam (Centimeters) | |
|---|---|---|---|---|---|---|
| | | | In | Return | In | Return |
| 1 | good | 160 | 9.6 | 9.3 | 50 | 100 |
| 2 | " | 160 | 9.8 | 9.6 | 80 | 80 |
| 3 | " | 160 | 9.7 | 9.4 | 80 | 85 |
| 4 | " | 170 | 9.9 | 9.5 | 80 | 80 |
| 5 | " | 170 | 9.9 | 9.4 | 80 | 80 |
| 6 | " | 170 | 9.9 | 9.4 | 80 | 80 |
| 7 | " | 170 | 9.9 | 9.6 | 80 | 80 |

Various embodiments and modifications of this invention have been described in the foregoing specification, and further modifications will be apparent to those skilled in the art. Such modifications are included within the scope of this invention as defined by the following claims.

Having now described our invention, we claim:

1. In the method for conducting foam drilling and workover operations in a bore hole penetrating a subterranean reservoir having a temperature of about 400° to 700° F., wherein foam is generated by contacting an aqueous solution of a foaming agent with a gas, and said foam is caused to flow upwardly through the bore hole to carry solid and liquid materials out of the bore hole, the improvement which comprises using as the foaming agent a mixture comprising: about 0.15 to 0.6 percent by weight of a first foaming agent comprising a high alkyl amphoteric betaine selected from the group consisting of coco-dimethyl carboxymethyl betaine, lauryl dimethyl carboxymethyl betaine, lauryl dimethyl alpha-carboxyethyl betaine, cetyl dimethyl carboxymethyl betaine, lauryl bis-(2 hydroxy-ethyl) carboxymethyl betaine, oleyl dimethyl gamma-carboxypropyl betaine, lauryl bis-(2 hydroxypropyl) alpha-carboxyethyl betaine, and the ammonium salts of the foregoing; and about 0.06 to 0.25 percent by weight of a second foaming agent comprising a sodium olefin sulfonate having from 10–18 carbon atoms.

2. The method defined in claim 1 wherein said aqueous solution of a foaming agent contains about 0.03 to 3.5 percent by weight of unneutralized ammonia.

3. The method defined in claim 2 wherein said unneutralized ammonia is added as ammonia or ammonium hydroxide.

4. The method defined in claim 2 wherein the amount of unneutralized ammonia used is sufficient to maintain the aqueous solution of the foaming agent during its use at a pH of 9.5 to 11.

5. The method defined in claim 1 wherein the gas is selected from the group consisting of nitrogen, natural gas, methane, carbon dioxide and air.

6. The method defined in claim 5 wherein the gas is air.

7. In the method for conducting foam drilling and workover operations in a bore hole penetrating a subterranean reservoir having a temperature of about 400° to 700° F., wherein foam is generated by contacting an aqueous solution of a foaming agent with a gas, and said foam is caused to flow upwardly through the bore hole to carry solid and liquid materials out of the bore hole, the improvement which comprises using as the foaming agent a mixture comprising:

about 0.08 to 1.0 percent by weight of a first foaming agent comprising coco dimethyl ammonium carboxylic acid betaine, and about 0.02 to 0.4 percent by weight of a second foaming agent comprising a salt of sodium olefin sulfonate having from 10–18 carbon atoms.

8. The method defined in claim 7 wherein said sodium olefin sulfonate has 14 carbon atoms per molecule.

9. The method defined in claim 1 wherein said aqueous solution of a foaming agent contains about 0.03 to 3.5 percent by weight of unneutralized ammonia.

10. The method defined in claim 9 wherein said unneutralized ammonia is added as ammonia or ammonium hydroxide.

11. The method defined in claim 9 wherein the amount of unneutralized ammonia used is sufficient to maintain the aqueous solution of the foaming agent during its use at a pH of 9.5 to 11.

12. The method defined in claim 1 wherein the gas is selected from the group consisting of nitrogen, natural gas, methane, carbon dioxide and air.

13. The method defined in claim 12 wherein the gas is air.

14. In the method for conducting foam drilling and workover operations in a bore hole penetrating a subterranean geothermal formation having a temperature of about 400° to 700° F., wherein foam is generated by contacting an aqueous solution of a foaming agent with a gas, and said foam is caused to flow upwardly through the bore hole to carry solid and liquid materials out of the bore hole, the improvement which comprises using as the said foaming agent a mixture comprising: about 0.15 to 0.6 percent by weight of a first foaming agent comprising a high alkyl amphoteric betaine selected from the group consisting of coco-dimethyl carboxymethyl betaine, lauryl dimethyl carboxymethyl betaine, lauryl dimethyl alpha-carboxyethyl betaine, cetyl dimethyl carboxymethyl betaine, lauryl bis-(2 hydroxyethyl) carboxymethyl betaine, oleyl dimethyl gamma-carboxypropyl betaine, lauryl bis-(2 hydroxypropyl) alpha-carboxyethyl betaine, and the ammonium salts of the foregoing; and about 0.06 to 0.25 percent by weight of a second foaming agent, comprising sodium olefin sulfonate having 14 carbon atoms per molecule.

15. The method defined in claim 14 where said aqueous solution of a foaming agent contains about 0.03 to 3.5 percent by weight unneutralized ammonia.

16. The method defined in claim 15 wherein said unneutralized ammonia is added as ammonia or ammonium hydroxide.

17. The method defined in claim 15 wherein the amount of unneutralized ammonia used is sufficient to maintain the aqueous solution of the foaming agent during its use at a pH of 9.5 to 11.

18. The method defined in claim 14 wherein the gas is selected from the group consisting of nitrogen, natural gas, methane, carbon dioxide and air.

19. The method defined in claim 18 wherein the gas is air.

* * * * *